United States Patent [19]
Bierman

[11] 3,827,707
[45] Aug. 6, 1974

[54] PORTABLE CARRIER

[76] Inventor: Jacob Bierman, 313 Cochran Ave., Los Angeles, Calif. 90036

[22] Filed: Dec. 26, 1972

[21] Appl. No.: 318,697

[52] U.S. Cl............................ 280/36 C, 280/47.24
[51] Int. Cl............................................. B62b 11/00
[58] Field of Search............ 280/36 C, 47.17, 47.24, 280/47.25, 47.26, 47.27, 47.37 R

[56] References Cited
UNITED STATES PATENTS

| | | | |
|---|---|---|---|
| 2,421,322 | 5/1947 | Frazin | 280/36 C |
| 3,035,847 | 5/1962 | Born | 280/36 C |
| 3,084,949 | 4/1963 | Forster | 280/47.37 R |
| 3,112,042 | 11/1963 | Leshner | 280/36 C |
| 3,191,959 | 6/1965 | Heimbruch | 280/36 C |

FOREIGN PATENTS OR APPLICATIONS

| | | | |
|---|---|---|---|
| 899,201 | 7/1944 | France | 280/36 C |

*Primary Examiner*—Robert R. Song
*Attorney, Agent, or Firm*—Max Geldin

[57] ABSTRACT

A portable carrier is described comprising a back support member, a bottom support member for conveying luggage, packages and the like, pivotally mounted at the lower end of the back support member, and a front support member pivotally mounted at the forward end of the bottom support member, a handle connected to the back support member which can be adjusted as desired, and a pair of wheels mounted at the lower extremity of the back support member for mobility of the carrier. The portable carrier is designed so that the front support member can be pivoted downwardly into engagement with the bottom support member, and the bottom support member, with the front support member in nested position thereagainst, in turn pivoted upwardly into engagement with the back support member, whereby the carrier in such inoperative nested substantially planar condition, occupies a minimum of storage space, and in such condition is readily portable.

10 Claims, 7 Drawing Figures

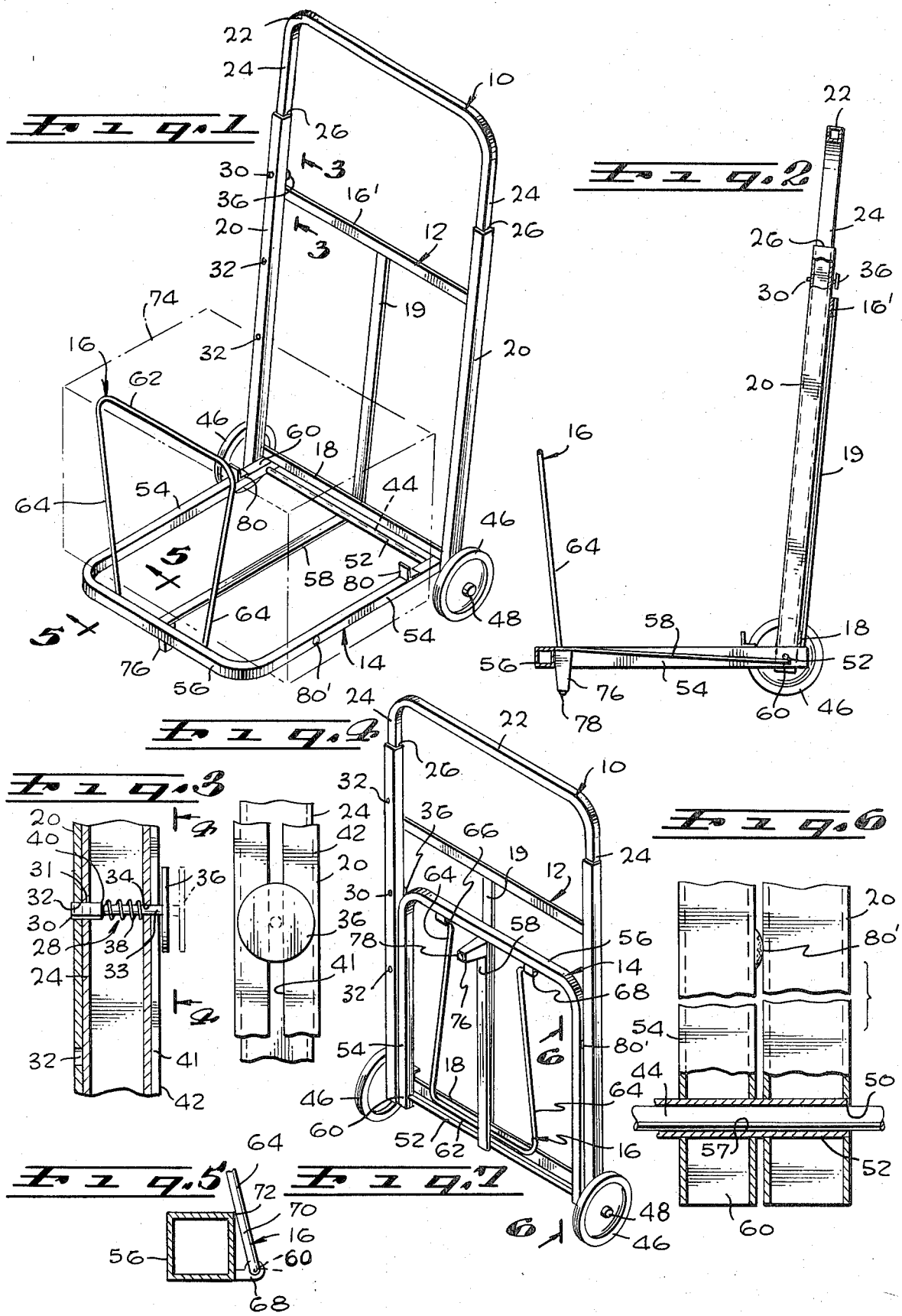

PORTABLE CARRIER

This invention relates to a portable carrier, and is particularly directed to a portable carrier of simple and economical design, which is easily manipulated for placement into an operative position for supporting luggage, packages and the like for movement thereof, and which can be readily manipulated to an inoperative position when it is not in use, and wherein the supporting components are in nested substantially planar position, so that the device occupies a minimum space in storage and is portable, the carrier being sturdy and durable.

A small portable carrier, which is economical, rugged and simple to operate would have wide utility. Many prior art carrier devices for transporting articles short distances are cumbersome and designed for heavy usage such as in warehouses, hospitals and in conveying heavy luggage at travel vehicle terminals, and are not designed in the form of a light compact unit adapted for a variety of common and ordinary home usages, as well as for somewhat heavier uses. Further, many of the presently employed heavy carrier devices are relatively expensive and do not have the ability to be folded into an inoperative position, whereby they occupy a minimum of space during non-use or storage, and are readily portable.

According to the present invention, a simple and inexpensive portable carrier is provided formed of a minimum of structural components. Basically, the device of the invention comprises a back support member which is normally held in an upwardly extended position, by means of a handle, which is adjustable and can be extended outwardly or contracted inwardly by the user as desired, a bottom support member which extends outwardly from the lower end of the back support member, and which functions as the basic support member for the articles to be conveyed by the device, and a front support member which is pivotally connected to the forward or outer end of the bottom support member. The device is designed so that in its operative position, the back support member, bottom support member and front support member are all maintained in their respective supporting positions so that articles in the form of packages, luggage and the like which are placed on the bottom member are supported therein, and are also supported against backward or forward movement by the back support member and the front support member.

Following use of the device, the portable carrier hereof is so designed that the operator merely pivots the front support member downwardly into engagement with the bottom support member, and the bottom support member, with the front support member nested thereagainst, is pivoted as a unit upwardly into engagement with the back support member, the result being that the back support member, the bottom support member and the front support member all now are nested into an inoperative substantially planar position, occupying a minimum of space during non-use or storage, and the device adapted for easy portability.

The invention will be understood more clearly from the description below of a preferred embodiment, taken in connection with the accompanying drawing wherein:

FIG. 1 is a perspective view showing the portable carrier of the invention in its operative position for transporting or moving articles;

FIG. 2 is a side elevational view of the carrier of FIG. 1, partly broken away;

FIG. 3 is a sectional detail showing the means for selectively adjusting the position of the handle with respect to the back support member;

FIG. 4 is a view taken on line 4—4 of FIG. 3;

FIG. 5 is a sectional detail showing the means for supporting the front support member, taken on line 5—5 of FIG. 1;

FIG. 6 is a sectional detail taken on line 6—6 of FIG. 7; and

FIG. 7 illustrates the pivoting of the front support member and the bottom support member into nesting engagement with the back support member, and placing the device in its inoperative position.

Referring to the drawing, the portable carrier 10 of the invention basically comprises a back support member 12, a bottom support member 14 pivotally connected at one end thereof to the lower end of back support member 12, and a front support member 16 pivotally connected at its lower end, to the forward end of the bottom support member 14. The components of the portable carrier hereof preferably are formed of a sturdy material, particularly a metal such as steel, but it is understood that the respective components of the device can be formed of other materials, such as plastics.

The back support member is comprised of a pair of laterally extending upper and lower metal strips 16' and 18 having welded thereto a central longitudinally extending metal strip 19. The ends of the lateral strips 16 and 18 are connected to a pair of longitudinally extending metal arms 20, such metal arms being tubular, and having a square cross section, as more clearly seen in FIG. 3, and similar to the square cross section of member 56 in FIG. 5.

Mounted for adjustable movement on the arms 20 is a laterally extending handle 22 having downwardly extending side members 24 for slidable engagement within the tubular arms 20 of back support member 12. The construction of the handle 22 including the side members 24 thereof, is of tubular metal having a square cross section of a size such that the square tubular side members 24 can be introduced into the open upper ends 26 of the tubular arms 20, with the outer surfaces of members 24 in matching but slidable engagement with the interior surfaces of the tubular arms 20, as seen in FIG. 3. The handle 22 can be locked into a plurality of selected extended and contracted positions, by means of a spring operated detent in the form of a pin 28 mounted on one of the side members 24 of handle 22, and having an enlarged forward end 30 which passes through a hole 31 in the front of such side member 24, and is receivable selectively in one of a plurality of holes 32 provided in the front surface of one of the tubular arms 20 within which the handle side member 24 carrying such pin slides. The pin 28 is slidable at its reduced outer end 33 through an aperture 34 at the rear of the side member 24 carrying the pin, and a knob 36 is connected to the outer extremity of such reduced end of the pin for manipulation of the enlarged forward end 30 of the pin into and out of the respective holes 32. A compression spring 38 is mounted on the central portion of the pin 28, one end of the spring abutting a shoulder 40 at the inner enlarged end 30 of the pin, the other end of the spring bearing against the inner surface of side member 24 around the periphery of the hole 34.

As seen in FIG. 4, a slot 41 is provided in the rear portion 42 of tubular arm 20 into which the side member 24 carrying the pin 28 is inserted. As seen in FIG. 3, the arm 24 of handle 22 is locked into an upper position by receipt of the enlarged end 30 of pin 28 into the upper hole 32. If it is desired to retract or push the handle 22 downwardly for adjustment thereof, the operator retracts pin 28 by pulling outwardly on the knob 36 to the dotted line position shown in FIG. 3, thereby withdrawing the enlarged end 30 of the pin from the upper hole 32 at the front of the arm 20, thereby permitting the side members 24 of handle 22 to be pushed downwardly by sliding engagement of the outer surfaces of the side members 24 with the inner surfaces of the tubular arm 20, until the pin 28 is opposite the lower hole 32 shown in FIG. 3, at which time the spring action of the compressed spring 38 will cause the enlarged outer end 30 of the pin to be urged forward into the lower hole 32, for locking engagement of the handle 22 into this lowered position, the slot 41 permitting movement of the outer reduced end of pin 28 along the rear surface of arm 20 during such adjustment, as seen in FIG. 7.

The back support member 12 is mounted adjacent its lower ends on an axle 44, on the outer ends of which are mounted a pair of wheels 46, held in position in suitable manner by hubs 48 mounted on opposite ends of the axle. Thus, the axle 44 is received in holes 50 in the lower ends of the arms 20, permitting pivotal movement of the back support 12 on the axle 44.

The bottom support member 14 comprises a laterally extending sleeve 52 which receives axle 44, sleeve 52 being freely rotatable on such axle. Sleeve 52 is connected at its opposite ends to a pair of side members 54, the forward ends of which are rounded inwardly and integrally connected to a front end member 56, members 54 and 56 also being of square tubular cross section, as seen in FIG. 5. Thee axle 44 also passes through suitable holes 57 adjacent the inner ends 60 of side members 54. A longitudinally extending central metal strip 58 is connected at its inner end to the sleeve 52 and at its outer end to the forward end member 56, as by welding, such strip 58 serving to aid in supporting articles placed upon the bottom support member 14. It is noted that the side members 54 of the bottom member 14 are spaced from each other a distance somewhat less than the distance between the inner surfaces of the arms 20 of back support member 12, to permit free pivotal movement of bottom support member 14 toward and away from back support member 12, by rotation of sleeve 52 on axle 44.

Referring to FIGS. 1 and 5, the front support member 16 is in the form of a generally inverted U-shaped member comprising a laterally extending end member 62 bent inwardly to form a pair of legs 64, legs 64 being bent outwardly at their ends to form short extensions 66 which are pivotally mounted in oppositely disposed sleeves 68 welded to the inside surface of the end member 56 of bottom support member 14, as best seen in FIGS. 5 and 7.

When the front support member 16 is pivoted in a counterclockwise direction, viewing FIG. 2, to its operative upwardly extending position as seen in FIGS. 1 and 2, the lower end portions 70 of the legs 64 of member 16 make contact at 72 (see FIG. 5) with the upper edge of the tubular end member 56 of bottom support 14, thus preventing further counterclockwise movement of member 16. The front support member 16 can be rotated or pivoted downwardly from its position shown in FIG. 2 in a clockwise direction until it is in a substantially horizontal position, with the lateral end 62 of member 16 in contact with the longitudinal metal strip 58 of bottom support member 14, as illustrated in FIG. 7.

When the bottom support member 14 is in its open horizontal operative position shown in FIG. 1, such bottom member 14 is maintained against further counterclockwise pivotal motion with respect to back support member 12, by contact of the rearwardly extending end portions 60 of the side members 54, with the lower surfaces of the bottom cross member 18 of the back support member 12.

In this open operative position of the bottom and front support members 14 and 16, as seen in FIGS. 1 and 2, luggage, boxes, packages and the like, as indicated in phantom lines at 74 in FIG. 1, can be supported on the bottom member 14, and prevented from backward or forward motion on the carrier during wheeling thereof, by the back and front support members 12 and 16.

There is connected to the lower surface of longitudinal strip 58 of bottom member 14, adjacent its outer end, a short bar 76 extending normal to, that is downwardly from, bottom member 14, as best seen in FIG. 2. Preferably there is provided at the lower or outer end of bar 76 a rotatable ball 78. Bar 76 serves as a support for the forward end of the portable carrier in its operative open position as seen in FIGS. 1 and 2, so that for example when the carrier is loaded with articles, and it is desired to maintain the loaded carrier at rest, bar 76 functions as a front support. Further, the portable carrier can be rolled with a load therein while th carrier is rotated by the operator slightly clockwise from its position shown in FIG. 2, so that bottom member 14 is pivoted to a position where support bar 76 and ball 78 are off the floor. Where loads are encountered, the carrier can be maintained in the position shown in FIG. 2 with the roller 78 maintained in contact with the floor and the carrier device rolled along while maintaining the ball 78 on bar support member 76, in continuous contact with the floor.

Preferably, stops 80 are connected to the rear or upper surface of the side members 54 of the bottom support 14, and positioned closely adjacent to the wheels 46, to serve as a stop for the articles loaded on the carrier and prevent obstruction of the wheels by the article or articles being transported.

After a period of use, when the carrier has been unloaded, the operator simply rotates front support member 16 clockwise, viewing FIG. 2, and downwardly into contact with the bottom support member as described above, these two elements now being in a substantially planar position as seen in FIG. 7, and the thus nested assembly of elements 14 and 16 is rotated clockwise into engagement with the back support member 12, such engagement being brought about by contact of end member 56 of bottom support 14, with the longitudinal strip 19 of back support member 12, as also seen in FIG. 7. To maintain the assembly of members 14 and 16 in such nested or folded position against back member 12, means such as for example rubber friction members 80' can be mounted along the outer opposite edges of sides 54 of member 14, for frictional engagement with the adjacent inner surfaces of the arms 20 of back support member 12, as seen in FIG. 7. In the folded inoperative position of the carrier as seen in FIG. 7, it is noted that all of the support members 12, 14 and 16 are nested together in substantially a single plane, so that the carrier can be readily stored or kept in a small space, and is readily portable by hand or in the trubk of a car, and available for use when and as desired.

It is seen that the invention provides a simple but rugged and easily operable portable carrier composed of a minimum of components which if damaged can be readily replaced or repaired, the device being readily foldable into a substantially single planar form when stored or not in use, but which is quickly manipulatable into an operative position for hauling articles, and readily suited for use in warehouses, hospitals, in the home, or in a car, especially when traveling.

While I have described particular embodiments of my invention for the purpose of illustration within the spirit of the invention, it will be understood that the invention is not to be taken as limited except by the scope of the appended claims.

I claim:

1. A portable carrier which comprises an upwardly extending back support member, a handle mounted on said back support member, adjusting means for extending and contracting said handle on said back support member, means for locking said handle in selected positions along said back support member, a bottom support member connected to said back support member, means for maintaining said bottom support member in a lowered operative position extending outwardly from said back support member, a first pivotal means pivotally mounting the inner end of said bottom support member in the lower end of said back support member, for pivotal movement of said bottom support member upwardly into inoperative position against said back support member, a front support member connected to the opposite outer end of said bottom support member and extending upwardly therefrom in the operative position of said front support member, means for maintaining said front support member in said upwardly extending position, and a second pivot means pivotally mounting said front support member on said bottom support member, for pivotal movement into contact with said bottom support member, whereby said front support member is foldable into engagement with said bottom support member, and said bottom support member together with said engaged front support member, is foldable into engagement with said back support member, with said back support member, said bottom support member and said front support member nested together into a substantially single plane.

2. A portable carrier as defined in claim 1, wherein aid back support member comprises a plurality of longitudinally extending arms, said handle comprising a plurality of side members slidably engageable with said arms, said adjusting means for said handle comprising a spring biased detent means for locking said side members in selected positions along said longitudinally extending arms of said back support member.

3. A portable carrier as defined in claim 1, said bottom support member comprising a pair of side members and an outwardly extending end member connected to said side members, an axle, wheels mounted on axle, said first pivot means mounted on said axle, said front support member being a substantially U-shaped member comprising an end member connected to a pair of side members, said second pivot means including shortened end portions connected to the outer ends of said last mentioned side members, and means mounting said last mentioned end portions for pivotal motion on said opposite outer end of said bottom support member.

4. A portable carrier as defined in claim 2, said bottom support member comprising a pair of side members and an outwardly extending end member connected to said side members, an axle, wheels mounted on said axle, said first pivot means mounted on said axle, said front support member being a substantially U-shaped member comprising an end member connected to a pair of side members, said second pivot means including shortened end portions connected to the outer ends of said last mentioned side members, and means mounting said last mentioned end portions for pivotal motion on said opposite outer end of said bottom support member.

5. A portable carrier as defined in claim 1, said back support member comprising a pair of longitudinally extending arms, said handle comprising a pair of side members slidably engageable with said arms, said back support member including a plurality of spaced laterally extending cross members, one of said cross members disposed adjacent the lower end of said back support member, said bottom support member comprising a pair of side members and an outwardly extending end member, an axle mounted adjacent the lower end of said back support member, wheels mounted on said axle, said means for mounting said bottom support member in a lowered operative position comprising inner end portions on the side members of said bottom support member, said inner end portions contacting said one of said cross members adjacent the lower end of said back support member.

6. A portable carrier as defined in claim 5, said means for mounting said front support member in said upwardly extending operative position comprising the lower outer end portions of said side members of said front support member contacting the adjacent outwardly extending end member of said bottom support member.

7. A portable carrier as defined in claim 1, said back support member comprising a pair of spaced longitudinally extending arms, said handle comprising a laterally extending handle portion and a pair of side members slidably engageable with said arms, said adjusting means for said handle comprising a spring biased pin mounted on one of said side members of said handle, a plurality of apertures positioned longitudinally along one of said arms of said back support member in slidable engagement with said last mentioned pin carrying side member of said handle, said pin being urged into engagement with said respective apertures at said predetermined positions of said apertures along said one of said arms.

8. A portable carrier as defined in claim 6, said adjusting means for said handle comprising a spring biased pin mounted on one of said side members of said handle, a plurality of apertures positioned longitudinally along one of said arms of said back support member in slidable engagement with said last mentioned pin carrying side member of said handle, said pin being urged into engagement with said respective apertures at said predetermined positions of said apertures along said one of said arms.

9. A portable carrier as defined in claim 1, including a downwardly extending support bar connected to the outwardly extending end of said bottom support member, a rotatable ball support positioned in the lower end of said support bar, and including means for maintaining the folded assembly of said front support member and bottom support member into folded inoperative engagement with said back support member.

10. A portable carrier as defined in claim 1, said back support member comprising a pair of longitudinally extending arms of substantially square tubular cross section, a plurality of laterally extending cross strips connected to said arms, a longitudinally extending central strip connected to said cross members, one of said cross strips being disposed adjacent the lower end of said back support member, said handle comprising a laterally extending handle portion and a pair of integrally connected downwardly extending side members, said side members being of substantially tubular cross section and mating with the tubular arms of said back support member for slidable engagement therein, said adjusting means for said handle comprising a spring biased pin mounted on one of said side members of said handle, a plurality of apertures positioned longitudinally along one of said arms of said back support member in slidable engagement with said last mentioned pin carrying side member of said handle, said pin being urged into engagement with said apertures at said respective positions of said apertures along said one of said arms, said bottom support members comprising a pair of side members, an outwardly extending end member connected to said last mentioned side members, an axle, wheels mounted on said axle, a sleeve connected across the inwardly extending ends of said side members of said bottom support member, said sleeve receiving said axle, a longitudinally extending central strip connected across the outwardly extending end member of said bottom support member and said sleeve, the opposite side member of said bottom support member being spaced from each other a distance such that said side members are disposed within said closely adjacent to but out of contact with the lower ends of said arms of said back support member, said last mentioned side members having inner end portions making contact with said lower cross strip of said back support member when said bottom support member is in the lowered outwardly extending operative position, said first pivot means comprising said sleeve mounted on said axle, said front support member being a substantially U-shaped member integrally connected to a pair of side members, said last mentioned side members having inwardly extending short end portions, a pair of sleeves mounted on the interior surface of said outwardly extending end member of said bottom support member, said second pivot means comprising said last mentioned end portions of said front support member positioned for pivotal movement in said last mentioned sleeves, including a downwardly extending support bar connected to the outwardly extending end of said bottom support member, a rotatable ball support positioned in the lower end of said support bar, and including means for maintaining the folded assembly of said front support member and bottom support member into folded inoperative engagement with said back support member, said last mentioned means comprising means associated with said side members of said bottom support member and the adjacent arms of said back support member.

* * * * *